United States Patent

Thiemann et al.

[11] Patent Number: 5,611,935
[45] Date of Patent: Mar. 18, 1997

[54] METHOD AND DEVICE FOR TREATING SLUDGE

[75] Inventors: Heinz Thiemann, Essen; Helmut Brauweiler, Lünen; Ivan Rupert, Essen; Jörg Bublies, Overath; Burkhard Möller, Kleinwaltersdorf, all of Germany

[73] Assignee: Steag Aktiengesellschaft, Essen, Germany

[21] Appl. No.: 481,461

[22] PCT Filed: Dec. 14, 1993

[86] PCT No.: PCT/EP93/03533

§ 371 Date: Aug. 18, 1995

§ 102(e) Date: Aug. 18, 1995

[87] PCT Pub. No.: WO94/14882

PCT Pub. Date: Jul. 7, 1994

[30] Foreign Application Priority Data

Dec. 17, 1992 [DE] Germany .......................... 42 42 747.9

[51] Int. Cl.$^6$ .................................................. C02F 11/12
[52] U.S. Cl. .................... 210/742; 210/770; 210/771; 210/101; 210/178; 34/360; 34/368; 34/379; 34/397; 34/575; 34/576; 34/586; 34/578; 110/245
[58] Field of Search ................ 34/360, 368, 379, 34/397, 575, 576, 586, 578; 210/742, 769–771, 97, 101, 175, 177, 178; 110/245; 366/151, 160

[56] References Cited

U.S. PATENT DOCUMENTS 4,330,411  5/1982  Florin et al. ........................... 210/769
4,560,527  12/1985  Harke et al. ........................... 264/500
5,419,267  5/1995  Raiko .................................... 110/245

FOREIGN PATENT DOCUMENTS

| 0396852 | 11/1990 | European Pat. Off. . |
| 0458221 | 11/1991 | European Pat. Off. . |
| 0491247 | 6/1992 | European Pat. Off. . |
| 0543133 | 5/1993 | European Pat. Off. . |
| 2943558 | 12/1980 | Germany . |
| 4016100 | 11/1991 | Germany . |
| 4013206 | 11/1991 | Germany . |
| 641133 | 5/1979 | Switzerland . |

*Primary Examiner*—Robert J. Popovics
*Attorney, Agent, or Firm*—Robert W. Becker & Associates

[57] ABSTRACT

A method for treating sludge by dewatering to form thick sludge and drying to form dry sludge includes the steps of mechanically predewatering thick sludge to produce predewatered thick sludge and mixing the predewatered thick sludge with non-cooled dry sludge to produce a sludge mixture. The temperature of the sludge mixture to be dried is measured and the dry substance contents of the dry sludge based on the measured temperature is determined. Fluctuations in the dry substance contents of the dry sludge are compensated by controlling the amount of recirculated dry sludge to be mixed with the predewatered thick sludge as a function of the temperature of the sludge mixture to be dried. The sludge mixture is dried to produce dry sludge and a portion of the dry sludge is recirculated to be mixed with the predewatered thick sludge.

13 Claims, 1 Drawing Sheet

5,611,935

METHOD AND DEVICE FOR TREATING SLUDGE

BACKGROUND OF THE INVENTION

The invention relates to a method and a device for treating sludge, especially sewage sludge, whereby dry sludge is mixed into mechanically predewatered thick sludge, the mixture is dried to form dry sludge, and the dry sludge is cooled before being transported away.

Such a sludge drying serves to condition the sludge primarily originating in water (sewage) treatment plants such that later on, optionally after intermediate storage, it can be disposed of, for example, by combustion in a refuse incinerator or as fertilizer in agriculture.

The sewage sludge, in general, contains an amount of dry substance of approximately 2 to 5 mass %. The mechanical predewatering process increases the dry substance contents to approximately 20 to 30 mass %. This thick sludge cannot be subjected directly to the actual drying process. Indeed, the drying process requires a dry substance contents of approximately 50 to 80 mass %. Therefore, the thick sludge is mixed with already dried sludge. During drying the dry substance contents of the mixture is increased to approximately 95 mass %. During this process the temperature of the dry sludge increases to approximately 120° C. In general, this temperature must be lowered before transporting the dry sludge to approximately 50° to 70° C. because otherwise an unacceptably high risk of self ignition is present.

European patent application 0 458 221 describes a method and a device of the aforementioned kind. Here, the temperature of the dryer is controlled by adjusting the mixture ratios between the thick sludge and the dry sludge. For this purpose, the gas temperatures of the recirculating gas is determined and fed into the control device. The latter controls the metering device and thus the amount of dry sludge to be admixed.

It has been found that the conventional sludge treatment needs improvement with respect to economic efficiency.

Accordingly, it is an object of the invention to provide a possibility for sludge treatment with increased efficiency.

SUMMARY OF THE INVENTION

The method for treating sludge by predewatering to form thick sludge and drying to form dry sludge according to the present invention is primarily characterized by:

a) mechanically predewatering thick sludge to produce predewatered thick sludge;

b) mixing the predewatered thick sludge with non-cooled dry sludge to produce a sludge mixture;

c) measuring the temperature of the sludge mixture to be dried;

d) determining the dry substance contents of the dry sludge based on the measured temperature;

e) compensating fluctuations in the dry substance contents of the dry sludge by controlling the amount of recirculated dry sludge to be mixed with the predewatered thick sludge as a function of the temperature of the sludge mixture to be dried;

f) drying the sludge mixture to produce dry sludge; and g) recirculating a portion of the dry sludge to step b).

The method further includes the step of adding dust, produced during the sludge treating process, to the predewatered thick sludge or the sludge mixture.

The step of drying preferably includes the step of employing a fluidized bed dryer and wherein, after drying, the dry sludge contains dust of a particle size of less than 500 μm in an amount of less than 20 mass % for use in the step of adding dust.

Advantageously, the method further includes the step of removing dust from the circulating dryer medium of the fluidized bed dryer for use in the step of adding.

Expediently, the method further comprises the step of recirculating, after removing dust therefrom, a portion of the exhaust vapor, produced during drying, into the fluidized bed dryer as a circulating dryer medium for use in the step of adding dust.

The method may also comprise the step of cooling the remaining portion of dry sludge, wherein the step of cooling includes the steps of employing a fluidized bed cooler and removing dust, for use in the step of adding, from the circulating cooler medium of the fluidized bed cooler.

In another embodiment of the inventive method, the aspiration air, generated by the mechanically predewatered thick sludge, is used as the circulating cooler medium.

The step of drying may include the step of employing a drum dryer and, after drying, the dry sludge has preferably a dust contents of a particle size of less than 500 μm of less than 20 mass %.

The method may further include the step of removing the dust from the circulating dryer medium of the drum dryer for use in the step of adding.

The method advantageously further comprises the step of recirculating, after removing dust particles, a portion of the exhaust vapor produced during drying into the drum dryer as a circulating dryer medium.

The present invention also relates to a device for performing the afore-described method. The device of the present invention is primarily characterized by:

at least one mixer;

a first inlet line connected to the mixer for supplying mechanically predewatered thick sludge;

a second inlet line connected to the mixer for supplying dry sludge;

a dryer connected downstream of the mixer;

a means for measuring the temperature of the sludge mixture;

a metering device for adjusting the throughput of dry sludge through the second inlet line;

a control device, connected to the means for measuring the temperature and to the metering device, for controlling as a function of the temperature the metering device for adjusting the throughput of the dry sludge.

In a preferred embodiment the device further comprises a deducting device connected to the dryer and the mixer, wherein the dryer is selected from the group of a fluidized bed dryer and a drum dryer and wherein exhaust vapor of the dryer is guided through the deducting device and partially recirculated into the dryer.

In another embodiment the device further comprises a fluidized bed cooler connected downstream to the dryer, the cooler comprising an air inlet line for connecting the cooler to a thick sludge reservoir and an air outlet line, and a deducting device connected to the mixer, wherein the air outlet line of the cooler is connected to the deducting device.

The dry substance contents of the thick sludge is not constant but is subject to fluctuations. These fluctuations however could not be automatically compensated in the past. The invention is based on the recognition that upon admixing hot dry sludge to the thick sludge the dry substance contents affects the temperature of the mixture. By measuring the temperature of the mixture it is thus possible to detect possible fluctuations of the dry substance contents of the thick sludge and to compensate them. This results in constant operating conditions of the actual drying step, so that the drying step can be maintained at an optimal efficiency. The measures required for this, i.e., the measuring of the temperature of the mixture and the corresponding control of the dosage of the dry sludge, are very simple. For a recirculation of cooled dry sludge the temperature of the mixture does not change substantially so that the temperature cannot perform the function of the lead parameter.

Preferably, dust, especially fine dust, is admixed to the thick sludge, or, the mixture to be dried, which dust is produced during the sludge treatment process, especially during the drying step and upon further treatment of the dry sludge. Repowdering thus is carried out by using a dry substance which otherwise would require a special further treatment.

Advantageously, the mixture is dried in a fluidized bed dryer or a drum dryer such that the dry sludge directly after drying has a fine dust contents of less than 20 mass % of a particle size of less than 500 µm in order to improve explosion protection.

In this context it is especially advantageous that the dust is removed from the circulating drying medium of the fluidized bed or the drum and is admixed to the thick sludge or the mixture to be dried. The circulating dryer medium is preferably a portion of the exhaust vapor, resulting from the drying process, which portion is recirculated.

It is furthermore especially advantageous that, upon performing cooling in a fluidized bed downstream of the dryer, dust is removed from the circulating fluidized bed dryer medium so that a further reduction of the fine dust contents can be achieved. In general, the thick sludge is stored intermediately whereby the aspiration air in the form of cold air is removed from the thick sludge reservoir. Thus, the circulating fluidized bed dryer medium for the cooling step is preferably in the form of this aspiration air which is produced by the mechanically predewatered thick sludge, as long as the methane contents of the aspiration air is not too great.

Of course, for the drying and cooling steps it is possible to use other methods than the fluidized bed or drum method; however, other methods are not quite as favorable.

The inventive sludge treatment device comprises at least one mixer which has an inlet line for mechanically prewatered thick sludge and an inlet line for dry sludge, further a dryer positioned downstream of the mixer, and a cooler positioned downstream of the dryer. This device is characterized in that the inlet line for the dry sludge leading into the mixer branches off upstream of the cooler, i.e., is branched off a connecting line connecting the dryer with the cooler or is in the form of a separate line extending from the dryer. Furthermore, a control device is provided which is connected with a temperature measuring means at the mixer as well as with a metering device which controls the throughput of dry sludge within the line leading into the mixer. The mixer is thus loaded with non-cooled dry sludge so that the dryer can be designed to have a correspondingly reduced output. Furthermore, the cooler must only cool the amount of dry sludge that is to be removed as finished product. Accordingly, the cooler can also be dimensioned to a correspondingly reduced output. With the inventive mixing control, it is possible with simple means to compensate for changes in the dry substance contents of the thick sludge with the corresponding admixture of dry sludge and to thereby maintain an optimal efficiency for the drying step.

In a further embodiment of the invention it is suggested that the dryer is a fluidized bed dryer the exhaust vapor of which is guided through a dedusting device and partially recirculated and that the dedusting device is connected to the mixer. The dust which is collected upon drying is thus used for the repowdering step so that a separate further dust treatment is obsolete.

Preferably, when using a cooler downstream of the dryer, the cooler is in the form of a fluidized bed cooler and connected via an air inlet line to a thick sludge reservoir as well as via an air outlet line to a dedusting device whereby the dedusting device is connected to the mixer. Thus, the dust which is produced during cooling is also used for repowdering whereby the aspiration air removed from the thick sludge reservoir is used as the circulating fluidized bed cooler medium. This results in a corresponding reduction of the amount of air to be disposed of.

Other combinations of the inventive features, which deviate from the previously discussed combinations, are also considered important to the present invention.

BRIEF DESCRIPTION OF THE DRAWINGS

In the following the invention will be described with the aid of a preferred embodiment in connection with the attached drawings. The drawings show a schematical representation of the inventive device.

DESCRIPTION OF THE PREFERRED EMBODIMENTS

Figure 1:
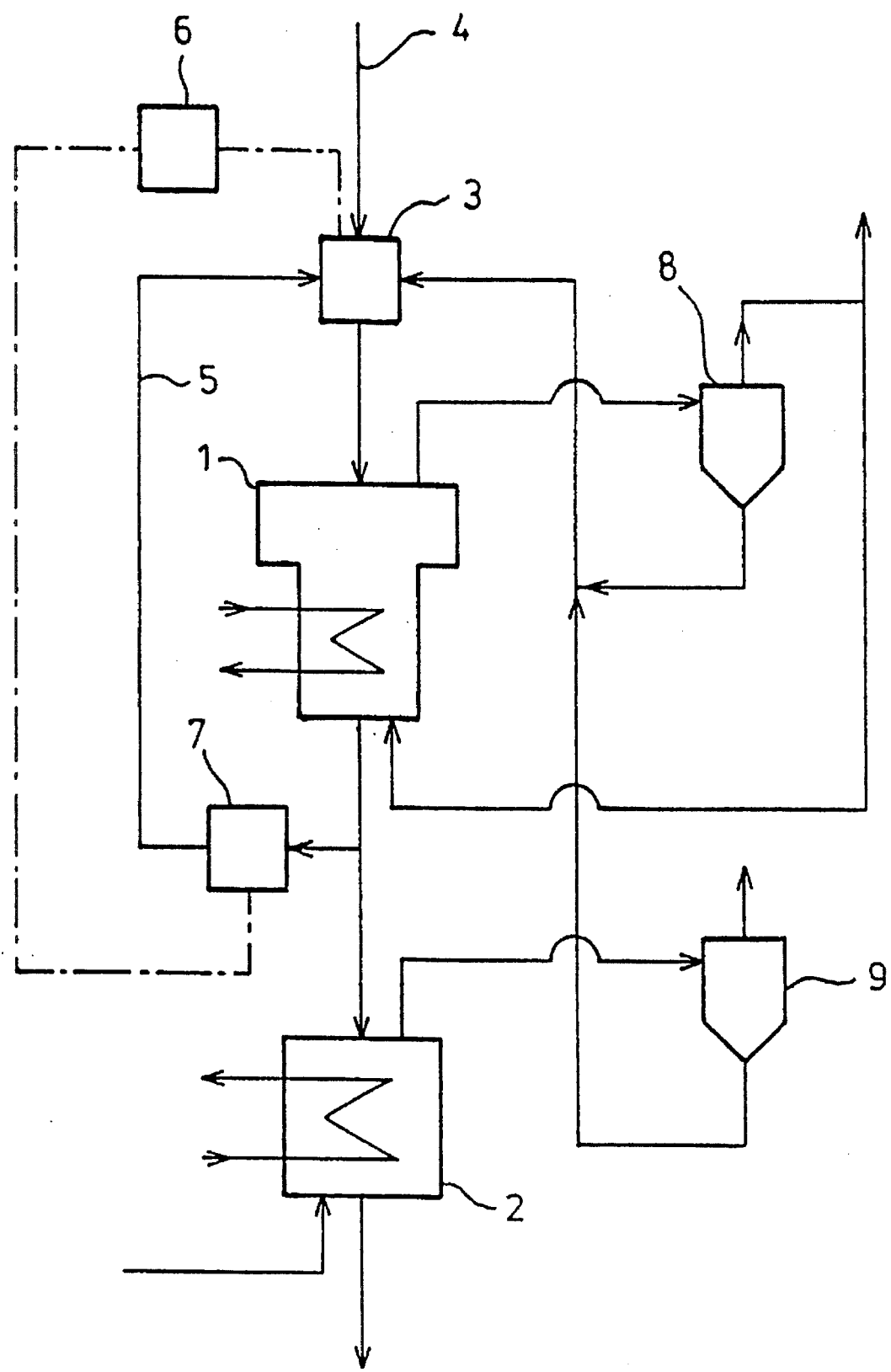

The device comprises as a main component a fluidized bed dryer 1 and a fluidized bed cooler 2. Upstream of the fluidized bed dryer 1 a mixer 3 is arranged which is supplied via an inlet line 4 with thick sludge, in general via mass-flow controlled pumps for thick materials. This thick sludge is mixed with non-cooled dry sludge whereby the latter is introduced into the mixer 3 via line 5 which branches off between the fluidized bed dryer 1 and the fluidized bed cooler 2.

The thick sludge is introduced into the mixer 3 with a dry substance contents of 25 mass %. The hot dry sludge which is introduced into the mixer 3 has a dry substance contents of 95 mass %. The supply of dry sludge is adjusted such that the fluidized bed dryer 1 contains a mixture with a dry substance contents of preferably 75 mass %. With respect to the dry substance to be introduced into the fluidized bed cooler 2, a ten-fold amount is recirculated through the line 5. Compared to a device in which the recirculating amount is branched off downstream of the cooler, the fluidized bed cooler 2 can, according to the present invention, be dimensioned so as to have an approximately 90% lower output. Furthermore, the heating output of the fluidized bed dryer 1 can be reduced since the recirculating dry sludge is already at the dryer temperature, i.e., is already heated to approximately 120° C.

The inventively controlled recirculation of the hot dry sludge furthermore has the special advantage that the drying process can be controlled with simplest means. For this purpose a control device 6 connected to a temperature measuring means within the mixer 3 and a metering device 7 in the line 5 is provided. By determining the temperature within the mixer 3 and correspondingly controlling the metering device 7, the dry substance contents of the mixture introduced into the fluidized bed dryer 1 can be maintained constant so that the unavoidable fluctuations of the dry substance contents of the thick sludge can be compensated. The temperature fluctuation range is approximately 5° to 8° C.

The exhaust vapor produced within the fluidized bed dryer 1 is introduced into a dedusting device 8. A portion of the exhaust vapor that has been dedusted is recirculated as a fluidized bed dryer medium into the fluidized bed dryer 1. The remaining exhaust vapor is disposed of. The dust which is collected within the dedusting device 8 is transported into the mixer 3 and accordingly included into the repowdering step.

Aspiration air is used as a fluidized bed cooler medium for the fluidized bed cooler 2 which is sucked from a non-represented thick sludge reservoir, however, only as long as the methane contents of the aspiration air does not surpass a safety limit value. Otherwise, the device is switched to sucking in surrounding air. The air exiting from the fluidized bed cooler 2 and containing dust is introduced into a dedusting device 9 and is subsequently disposed of. The dust from the dedusting device 9 is also introduced into the mixer 3 and is thus contained within the sludge granules to be introduced into the fluidized bed dryer 1.

The dedusting of the dry sludge is especially important with respect to explosion prevention. The inventive recirculation of the dust makes obsolete an otherwise required fine dust storage, optionally with an upstream filtration step. The mixer 3 can serve to receive all other dusts that are collected within the further treatment course.

Other embodiments can be envisioned within the scope of the invention. Even though fluidized bed devices are especially advantageous for drying and cooling, it is possible to envision other designs. Furthermore, it is possible to employ different fluidized bed dryer and cooler media. The essential advantages of the process design and control are independent of the dust recirculation even though the latter provides a considerable contribution to explosion prevention and economic efficiency.

The present invention is, of course, in no way restricted to the specific disclosure of the specification and drawings, but also encompasses any modifications within the scope of the appended claims.

We claim:

1. A method for treating sludge by predewatering to form thick sludge and drying to form dry sludge, said method comprising the steps of:
   a) mechanically predewatering thick sludge to produce predewatered thick sludge;
   b) mixing the predewatered thick sludge with non-cooled dry sludge to produce a sludge mixture;
   c) measuring the temperature of the sludge mixture to be dried;
   d) determining the dry substance contents of the dry sludge based on the measured temperature;
   e) compensating fluctuations in the dry substance contents of the dry sludge by controlling the amount of recirculated dry sludge to be mixed with the predewatered thick sludge as a function of the temperature of the sludge mixture to be dried;
   f) drying the sludge mixture to produce dry sludge; and
   g) recirculating a portion of the dry sludge to step b).

2. A method according to claim 1, further including the step of adding dust, produced during the sludge treating process, to one of the predewatered thick sludge and the sludge mixture.

3. A method according to claim 2, wherein the step of drying includes the step of employing a fluidized bed dryer and wherein, after drying, the dry sludge contains dust of a particle size of less than 500 μm in an amount of less than 20 mass % for use in said step of adding dust.

4. A method according to claim 2, further including the step of removing dust from the circulating dryer medium of the fluidized bed dryer for use in said step of adding.

5. A method according to claim 2, further comprising the step of recirculating, after removing dust, a portion of the exhaust vapor, produced during drying, into the fluidized bed dryer as a circulating dryer medium for use in said step of adding dust.

6. A method according to claim 2, further comprising the step of cooling the remaining portion of dry sludge, wherein said step of cooling includes the steps of employing a fluidized bed cooler and removing dust, for use in said step of adding, from the circulating cooler medium of the fluidized bed cooler.

7. A method according to claim 6, further comprising the step of using the aspiration air, generated by the mechanically predewatered thick sludge, as the circulating cooler medium.

8. A method according to claim 2, wherein the step of drying includes the step of employing a drum dryer and wherein, after drying, the dry sludge has a dust contents of a particle size of less than 500 μm of less than 20 mass %.

9. A method according to claim 8, further including the step of removing the dust from the circulating dryer medium of the drum dryer for use in said step of adding.

10. A method according to claim 8, further comprising the step of recirculating, after removing dust particles, a portion of the exhaust vapor produced during drying into the drum dryer as a circulating dryer medium.

11. A device for treating sludge, said device comprising:
    at least one mixer;
    a first inlet line connected to said mixer for supplying mechanically predewatered thick sludge;
    a second inlet line connected to said mixer for supplying dry sludge;
    an outlet line for transporting a resultant sludge mixture from said mixer to a dryer connected downstream of said mixer;
    a means for measuring the temperature of the sludge mixture;
    a metering device for adjusting the throughput of dry sludge through said second inlet line;
    a control device, said control device being connected to said means for measuring the temperature and to said metering device, wherein said control device adjusts the throughput of dry sludge through said metering device as a function of the temperature of the sludge mixture.

12. A device according to claim 11, further comprising a deducting device connected to said dryer and said mixer, wherein said dryer is selected from the group consisting of a fluidized bed dryer and a drum dryer, wherein exhaust vapor of said dryer is guided through said deducting device and partially recirculated into said dryer.

13. A device according to claim 11, further comprising:
    a fluidized bed cooler connected downstream of said dryer, said cooler comprising an air inlet line for connecting said cooler to a thick sludge reservoir and an air outlet line; and
    a deducting device connected to said mixer, wherein said air outlet line of said cooler is connected to said deducting device.

* * * * *